United States Patent
Gaillard et al.

[19]

[11] Patent Number: 5,904,179
[45] Date of Patent: May 18, 1999

[54] INLET CHECK VALVE

[75] Inventors: Michael E. Gaillard; Steve W. Balls, both of Joplin, Mo.

[73] Assignee: Waterjet Service, Inc., Joplin, Mo.

[21] Appl. No.: 08/971,027

[22] Filed: Nov. 14, 1997

[51] Int. Cl.$^6$ .................................................. F16K 15/00
[52] U.S. Cl. .................. 137/533; 137/512; 137/533.21; 137/417; 137/567; 137/571
[58] Field of Search .............................. 137/533.31, 512, 137/533, 534, 417, 567, 571, 533.21

[56] References Cited

U.S. PATENT DOCUMENTS

| | | |
|---|---|---|
| 625,114 | 5/1899 | MacSpadden . |
| 1,165,100 | 12/1915 | Holland ............................ 137/533.31 |
| 1,539,127 | 5/1925 | Lipman ............................ 137/533.21 |
| 1,608,424 | 11/1926 | Putnam ............................ 137/533.21 |
| 1,785,313 | 12/1930 | Keener . |
| 2,001,885 | 5/1935 | Ohmart . |
| 2,043,849 | 6/1936 | Bixler . |
| 2,048,943 | 7/1936 | Munn . |
| 2,118,356 | 5/1938 | Money . |
| 2,143,399 | 1/1939 | Abercrombie ................... 137/533.31 |
| 2,217,380 | 10/1940 | Pedder et al. . |
| 2,264,136 | 11/1941 | Karlberg ......................... 137/533.31 |
| 2,268,119 | 12/1941 | Honstetter et al. ............. 137/533.31 |
| 2,296,135 | 9/1942 | Batson et al. . |
| 2,353,161 | 7/1944 | Heigis et al. . |
| 2,725,183 | 11/1955 | Hanson . |
| 2,996,155 | 8/1961 | Priesemuth . |
| 3,060,961 | 10/1962 | Conley . |
| 3,106,169 | 10/1963 | Prosser et al. . |
| 3,123,867 | 3/1964 | Combs . |
| 3,260,217 | 7/1966 | Thresher . |
| 3,309,013 | 3/1967 | Bauer . |
| 3,309,014 | 3/1967 | Bauer et al. . |
| 3,503,079 | 3/1970 | Smith .............................. 137/533.21 |
| 3,526,246 | 9/1970 | Leitgeb . |
| 3,544,065 | 12/1970 | Mercier . |
| 3,659,967 | 5/1972 | McArthur et al. . |
| 3,765,306 | 10/1973 | Luft . |
| 4,026,322 | 5/1977 | Thomas . |
| 4,098,085 | 7/1978 | McDowell . |
| 4,371,001 | 2/1983 | Olsen . |
| 5,037,277 | 8/1991 | Tan . |
| 5,226,799 | 7/1993 | Raghavan et al. . |
| 5,337,561 | 8/1994 | Raghavan et al. . |
| 5,381,631 | 1/1995 | Raghavan et al. . |
| 5,564,469 | 10/1996 | Tremoulet, Jr. et al. . |

*Primary Examiner*—Denise L. Ferensic
*Assistant Examiner*—Joanne Y. Kim
*Attorney, Agent, or Firm*—Wood, Herron & Evans, L.L.P.

[57] ABSTRACT

A check valve assembly mounted on an end surface of a projection of a valve body. The check valve assembly includes a valve having a sealing surface on one side and a stem on an opposite side, and the valve body includes a fluid inlet intersecting the end surface of the projection. A rigid mounting plate has a first locating element adapted to locate the mounting plate with respect to the end surface on the projection. The mounting plate has a second locating element adapted to receive a fastener for attaching the mounting plate to the end surface of the projection. A clearance hole in the mounting plate is sized to receive the stem of the valve. The stem of the valve moves freely within the first clearance hole thus permitting the valve to move freely between open and closed positions.

21 Claims, 1 Drawing Sheet

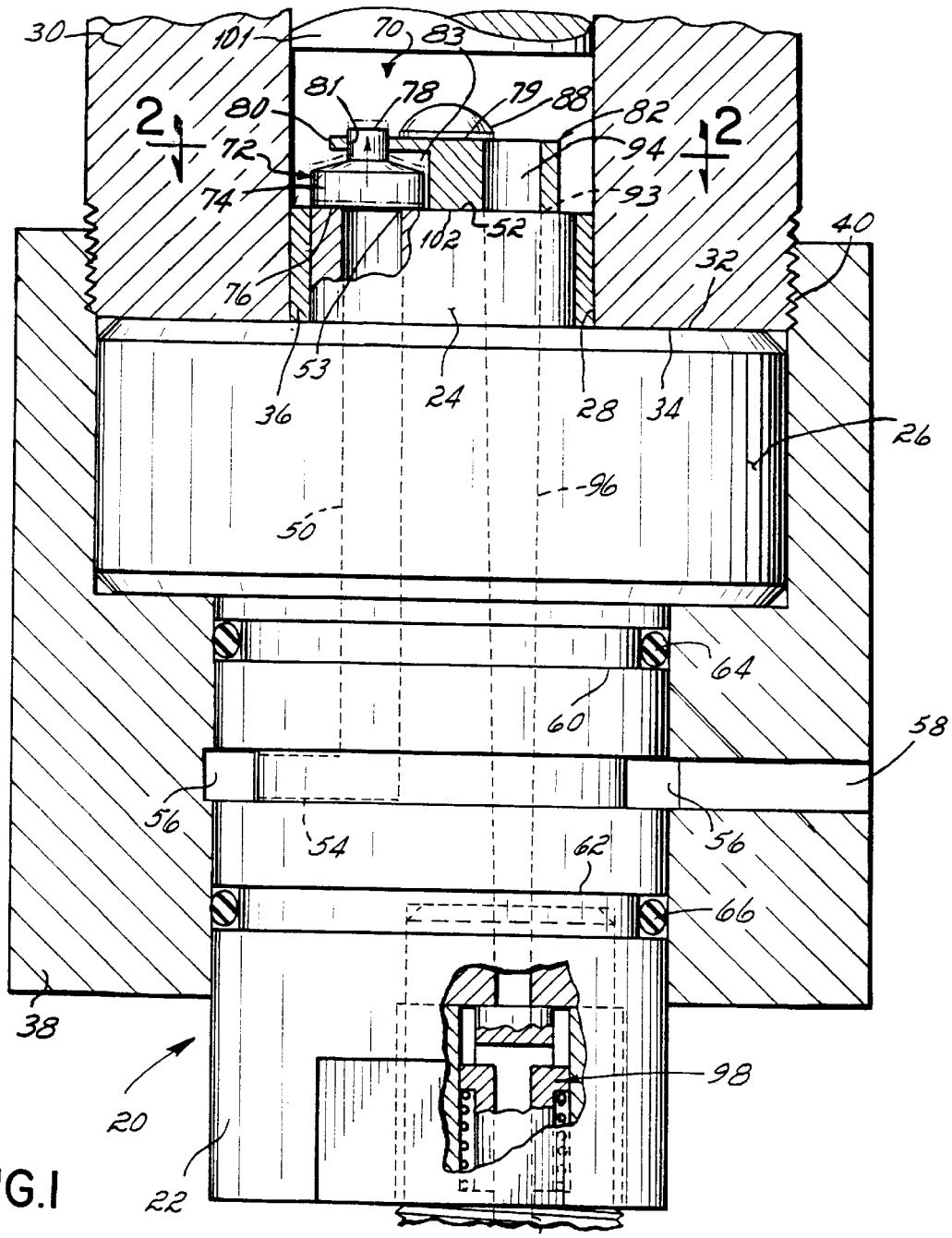
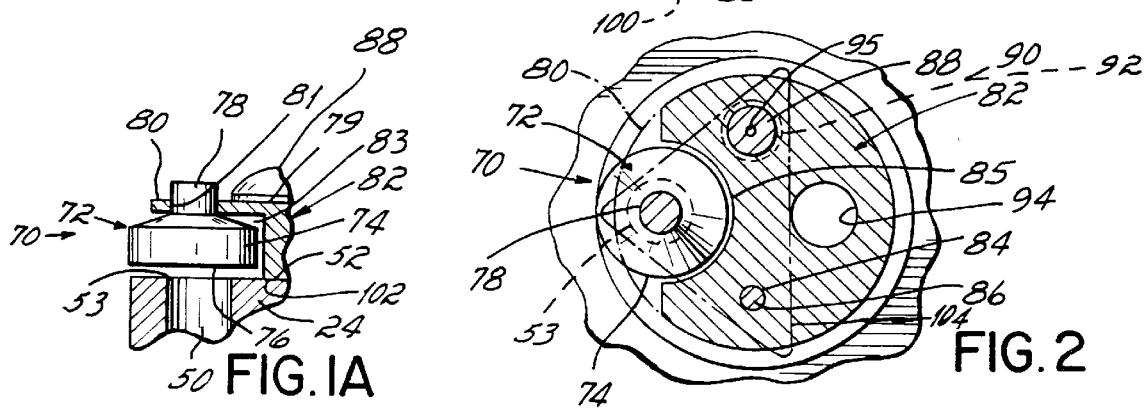
FIG.1
FIG.1A
FIG.2

INLET CHECK VALVE

FIELD OF THE INVENTION

This invention relates generally to the field of check valves and, more particularly, to an improved check valve for use with a high pressure hydraulic cylinder.

BACKGROUND OF THE INVENTION

An inlet check valve for use with high pressure cylinders, for example, up to a 40,000 psi or greater, must be capable of operating reliably at such high pressures. One example of an inlet check valve assembly is described in U.S. Pat. No. 4,371,001 which discloses an inlet valve mounted on the end of a projecting portion of a generally cylindrical check valve body. The inlet check valve has a valve element that is mounted over an inlet passage. The inlet valve element tapers from a lower larger diameter to a thin shaft that is pressed into an opening on one end of a leaf spring. The opposite end of the leaf spring is secured to the projection of the valve body by a mounting screw extending through a spacer into a threaded hole in the valve body. The spacer has a height equal the height of the valve element such that the leaf spring is approximately perpendicular to the center lines of the mounting screw and the valve element. Such a check valve normally functions well in service, however, the design does have several disadvantages. First, the leaf spring is capable of rotation with respect to its mounting screw. Therefore, the valve element may be installed off-center with respect to the inlet passage, or the valve element may be moved off-center during operation of the cylinder pump. When the valve is off-center and misaligned with the inlet passage, the valve element is subjected to uneven wear and overheating. In addition, the leaf spring can bend or otherwise inhibit the valve from having the proper lift, thereby potentially causing overheating and reducing pump efficiency. Further, the assembly of the valve element and leaf spring must be replaced whenever the valve element itself must be replaced, thereby increasing the cost of valve replacement. Consequently, there is the need for an improved inlet check valve.

SUMMARY OF THE INVENTION

The present invention provides an inlet check valve with a mounting plate that is more reliable and stable in its operation and is more easily assembled and economically replaced. Further, the inlet check valve of the present invention operates to reliably charge an associated reciprocating pump without malfunctioning and overheating.

In accordance with the principles of the present invention and in accordance with the described embodiments, the present invention provides a check valve assembly mounted on an end surface of a projection from a valve body. The check valve assembly includes a valve having a sealing surface on one side and a stem on an opposite side, and the valve body has a fluid inlet intersecting the end surface of the projection. The check valve assembly further includes a rigid mounting plate having a first locating element adapted to receive a fastener for attaching the mounting plate to the end surface of the projection and a clearance hole sized to receive the stem of the valve. The stem of the valve moves freely within the clearance hole between a closed position at which the sealing surface is in a bearing relationship to the end surface of the projection, thereby blocking a flow of liquid through the fluid inlet, and an open position at which the sealing surface is positioned away from the end surface of the projection, thereby permitting the flow of liquid through the fluid inlet. The rigid mounting plate has the advantage of fixing the lift of the poppet valve, thereby assuring a consistent operation from cycle to cycle.

In one aspect of the invention, the first locating element is a hole for receiving the fastener and is offset from a fluid outlet in the end surface of the projection. In another aspect of the invention, a second locating element is a hole adapted to receive a pin extending from the end surface of the projection. The two locating elements have an advantage of permitting the mounting plate and check valve to be easily assembled; and further, with two locating elements, the check maintains it desired alignment with respect to the inlet.

In a further aspect of the invention, the mounting plate has a cavity for receiving the valve and the clearance hole is located in a flange on the mounting plate extending over the cavity. Therefore, the invention has the further advantage of being able to easily disassemble the check valve and replace the valve without having to replace any other parts. Thus, the cost of servicing the check valve is reduced.

These and other objects and advantages of the present invention will become more readily apparent during the following detailed description together with the drawings herein.

BRIEF DESCRIPTION OF THE DRAWINGS

FIG. 1 is a side elevation view of a check valve body illustrating a valve element of the inlet check valve in its closed position in accordance with the principles of the present invention.

FIG. 1A is a partial side elevation view illustrating the valve element of the inlet check valve element in its open position.

FIG. 2 is cross-sectional top view of the inlet check valve taken along line 2—2 of FIG. 1.

DETAILED DESCRIPTION OF THE INVENTION

Referring to FIG. 1, a check valve assembly 20 of the present invention includes a generally cylindrical check valve body 22. The check valve body 22 has a centrally located cylindrical projection 24 that extends beyond a larger diameter flange 26 into the bore 28 of a high pressure hydraulic cylinder or pump 30. The flange 26 has an annular surface 32 that bears against an end surface 34 of the cylinder 30 An annular seal 36 fills the gap between the outer surface of the projection 24 and the inner surface of the bore 28. The check valve body 22 is secured to the end of a high pressure hydraulic cylinder 30 by means of an end cap 38 screwed onto the threaded end 40 of the cylinder 30.

The check valve body 22 has an off center low pressure fluid inlet passage 50 with one end intersecting a seating or end surface 52 on the end of the projection 24 to form a fluid inlet orifice 53. The other end of passage 50 intersects a radial passage 54. The radial passage 54 intersects an annular groove 56 that in turn is aligned with a radial passage 58 within the end cap nut 38. The radial passage 58 is connected to a source of low pressure fluid (not shown). The valve body 22 further includes annular grooves 60, 62 that receive O rings 64, 66 for providing a fluid-tight seal between the valve body 22 and the end cap 38.

Referring to FIGS. 1 and 2, an inlet check valve 70 is mounted on the seating surface 52 of the projection 24. The inlet check valve 70 includes a poppet valve 72 having a larger diameter of valve body 74 with a flat bearing or sealing surface 76 on one side. The other side of the cylindrical body 74 tapers into a smaller diameter valve stem or shaft 78 that extends through a clearance hole 81 of a mounting plate 82. The clearance hole 81 is radially displaced from the centerline of the valve body 22 and is concentric with the inlet fluid passage 50. The mounting plate 82 has an upper side 79 with an arcuate and preferably circular periphery extending parallel to the surface 52 of the projection 24. A portion of the upper side 79 forms a flange 80, and a clearance hole 81 is located in the flange 80. A cavity 83 is located below the flange 80 between the upper side 79 and a lower surface 102 of the mounting plate 82 and has an arcuate portion 85 sized to receive and provide clearance for the valve body 74. Thus, the valve 72 is able to move freely in the cavity 83 and in a direction generally parallel to a centerline of the valve body 22; and lift of the valve 72 is fixed by the relative vertical height of the main body portion of the valve 72 and the height of the cavity 83.

The mounting plate 82 has a first locating element, for example, a locating hole, 84 sized to receive a locating pin 86 fixed into the surface 52 of the projection 24. The mounting plate 82 has a second locating element, for example, a second locating hole, 90 which receives a fastener, for example, a screw, 88. The screw 88 extends through the locating hole 90 and is screwed into a threaded hole 92 within the projection 24, thereby attaching the mounting plate to the seating surface 52 of the projection 24. Normally, the screw 88 contains a center through-hole 95 that functions to equalize pressure within the threaded hole 92 during the fill and discharge strokes of the piston 101 within the cylinder 30. Thus, the mounting plate 82 is precisely positioned with respect to the end surface 52 of the projection 24 by the guide pin 86 and the screw 88. Consequently, the position of the valve 72 is fixed with respect to the inlet 53; and if through usage, screw 88 loosens, the locating pin 86 holds the mounting plate 82 in its desired position, thereby maintaining the poppet valve 72 centrally over the inlet passage 50. The mounting plate 82 further includes an off center fluid outlet bore 94 that is coextensive with an off center fluid outlet passage 96 within the valve body 22. One end of the outlet passage 96 intersects the seating surface 52 to form a fluid outlet 93, and the other end of outlet passage 96 is fluidly connected to an outlet check valve 98 within the body 22. Fluid passing through the check valve 98 exits the valve body 22 through an outlet 100.

In use, referring to FIG. 1, during an intake stroke, a piston 101 within the cylinder 30 moves away from the projection 24 thereby creating a pressure differential across the inlet check valve 70 such that the fluid in the inlet passages 50, 54, 56, 58 which is under a relatively small positive pressure pushes the sealing surface 76 of the poppet valve 72 away from the seating surface 52 of the projection 24 to an open position as illustrated in FIG. 1A. When in the open position, fluid readily flows from the fluid source (not shown) through the passage 58 and the inlet fluid passages 50, 54, 56 in the valve body 22 to fill the bore 28 of the cylinder 30. When the piston 101 in the cylinder 30 reverses direction, a very high fluid pressure is applied to the upper surfaces (as viewed in FIG. 1) of the poppet valve 72, thereby creating a pressure differential which pushes the sealing surface 76 of the valve 72 to a closed position, that is, into bearing contact with an annular portion of seating surface 52 surrounding the inlet 53 on the projection 24, thereby closing and sealing the inlet orifice 53 as illustrated in FIG. 1. Thus, fluid is prevented from passing through inlet 53 into the bore 50. The high pressure fluid then passes through bore 94 in mounting plate 82, through outlet orifice 93, outlet passage 96, outlet check valve 98 and through the outlet 100 of the valve body 22. Thus, during the operation of the cylinder pump 30, the position of the valve 72 is advantageously held concentric with the inlet 53 and operates through fixed open and close strokes. Therefore, the valve 72 wears evenly during use, is less subject to overheating and provides a highly repeatable fill cycle.

When it is desired to maintain or replace the valve 72, the end cap 38 is unscrewed from the end 40 of the cylinder 30; and the valve body 22 is removed from the end of the cylinder 30. Removing the screw 88 releases the mounting plate 82 and valve 72 from the projection 24. The valve 72 is removed from the hole 81 and a replacement valve is inserted therefor. The hole 84 in the mounting plate 82 is positioned over the locating pin 86, and the screw 88 is again inserted into the threaded hole 92. That process automatically aligns the valve 72 in its desired concentric position with respect to the inlet 53, and the screw 88 is tightened to bring the lower surface 102 of the mounting plate into bearing contact with the end surface 52 of the projection 24. Further, if the screw 88 is not fully tightened or loosens during operation, the valve 72 cannot move but maintains its desired concentric relationship with the inlet 53. Advantageously, the valve 72 is not permanently connected to any other component, and therefore, can be replaced by itself, thereby minimizing the cost of replacement. Thus, the above design provides an inlet check valve that functions reliably throughout its normal operating life.

While the invention has been set forth by a description of the preferred embodiment in considerable detail, it is not intended to restrict or in any way limit the claims to such detail. Additional advantages and modifications will readily appear to those who are skilled in the art. For example, while the poppet valve body is described as being cylindrical, it may also be any other profile such that it has a sealing surface 76 sufficiently large to cover the inlet fluid passage 50. Further, the poppet valve stem 78 is generally cylindrical and moves freely in and out of the clearance hole 81 within the mounting plate 82. Alternatively, the stem 78 may have a different cross-sectional profile; and further, the distal end of the valve stem 78 may be flattened slightly to prevent the valve stem 78 from being removed from the clearance hole 81. However, care must be taken such that the valve body 72 continues to move freely between its closed position illustrated in FIG. 1 and its open position illustrated in FIG. 1A.

As will be appreciated, the locations of the locating hole 84 and locating pin 86 may be reversed such that the locating hole extends through the surface 52 of the projection 24 and the locating pin is attached to the mounting plate 82. Further, the major cross-sectional profile of the mounting plate 82 may have alternate shapes, and it is not required that the plate 82 cover the outlet 93. For example, the major cross-sectional profile of the plate 82 may be a triangular shape 104 as illustrated in phantom in FIG. 2.

In the described embodiment, the fastener 88 is screwed into a threaded hole 90 which is offset and displaced from the outlet passage 96. As will be appreciated, the end of the outlet passage 96 can be threaded, and the screw 88 threaded into the outlet passage 96. In that embodiment, the outlet passage 96 becomes the second locating element, and hole 90 is not required. In addition, the screw 88 must have a bore extending longitudinally therethrough in order to carry fluid from the bore 28 of the cylinder 30 into the passage 96. Alternatively, the locating hole 84 and pin 86 may be eliminated, and a second locating element provide by a sleeve mounted in the clearance hole 81 that is sized to extend into the outlet fluid passage 96. In a further alternative embodiment, the second locating element may be eliminated; and the mounting plate held in place by the torque applied to the screw 88.

The invention therefore, in its broadest aspects is not limited to the specific detail shown and described.

Consequently, departures may be made from the details described herein without departing from the spirit and scope of the claims which follow.

What is claimed is:

1. An apparatus for a check valve assembly mounted on an end surface of a projection extending from one end of a valve body, the check valve assembly including a valve having a sealing surface on one side and an integral stem on an opposite side, the valve body having a fluid inlet intersecting the end surface of the projection, the apparatus comprising:
    a rigid mounting plate having
        a first locating element adapted to receive a fastener attaching the mounting plate to the end surface of the projection,
        a clearance hole sized to receive the stem of the valve,
        the sealing surface of the valve bearing against the end surface of the projection to define a closed valve position blocking a flow of liquid through the fluid inlet, and
        the sealing surface of the valve being positioned away from the end surface of the projection to define an open valve position permitting the flow of liquid through the fluid inlet.

2. The apparatus of claim 1 wherein the mounting plate further has a second locating element adapted to locate the mounting plate with respect to the end surface on the projection.

3. The apparatus of claim 1 wherein the mounting plate has a lower side with an area adapted to contact the end surface of the projection.

4. The apparatus of claim 1 wherein the mounting plate has a major cross-sectional profile having a generally arcuate profile.

5. The apparatus of claim 4 wherein of the mounting plate has a major cross-sectional profile having a generally circular profile.

6. The apparatus of claim 1 wherein the mounting plate has a major cross-sectional profile having with a multilateral shape.

7. The apparatus of claim 3 wherein the mounting plate has an opposite upper side and a cavity located between a portion of the upper side and the lower side for receiving the valve.

8. The apparatus of claim 7 wherein the upper side of the mounting plate forms a flange over the cavity, and the clearance hole for the valve stem extends through the flange.

9. The apparatus of claim 2 wherein the second locating element is a hole adapted to receive a locating pin attached to the end surface of the projection.

10. The apparatus of claim 2 wherein the second locating element is a pin adapted to extend into a hole in the end surface of the projection.

11. The apparatus of claim 2 wherein the valve body has an fluid outlet intersecting the end surface of the projection and the first locating element is a hole for receiving the fastener.

12. The apparatus of claim 11 wherein the hole for receiving the fastener is concentric with the fluid outlet in the end surface of the projection.

13. The apparatus of claim 11 wherein the hole for receiving the fastener is displaced from and not concentric with the fluid outlet in the end surface of the projection.

14. The apparatus of claim 13 wherein the mounting plate has an outlet opening positioned to be generally concentric with the outlet.

15. A check valve assembly mounted on an end surface of a projection extending from one end of a valve body, the valve body having a low pressure fluid inlet and a high pressure fluid outlet intersecting the end surface of the projection, the check valve assembly comprising:
    a valve having
        a sealing surface on one side having an area larger than, and positioned concentrically with respect to, an area of the fluid inlet, and
        an integral stem on an opposite side;
    a mounting plate having
        a lower side having an area adapted to contact the end surface of the projection,
        a first locating element adapted to locate the mounting plate with respect to the end surface on the projection, and
        a second locating element adapted to receive a fastener attaching the mounting plate to the end surface of the projection,
        a clearance hole sized to receive the stem of the valve,
        the sealing surface of the valve bearing against the end surface of the projection to define a closed valve position blocking a flow of liquid through the fluid inlet, and
        the sealing surface of the valve being positioned away from the end surface of the projection to define an open valve position permitting the flow of liquid through the fluid inlet.

16. The check valve assembly of claim 15 wherein the mounting plate further comprises an upper side and an arcuate cavity located between the upper and lower sides of the mounting plate for receiving the valve.

17. The check valve assembly of claim 16 wherein the mounting plate has a flange formed from a portion of the upper side of the mounting plate and over the arcuate cavity.

18. The check valve assembly of claim 17 wherein the clearance hole is located in the flange.

19. A check valve assembly comprising:
    a valve body having a projection extending from one end, the projection having an end surface intersecting a low pressure fluid inlet and a high pressure fluid outlet;
    a valve having
        a sealing surface on one side centrally located with respect to, and being larger than, the fluid inlet, and
        an integral stem on an opposite side;
    a mounting plate having
        a first locating element adapted to locate the mounting plate with respect to the end surface on the projection, and
        a second locating element adapted to receive a fastener attaching the mounting plate to the end surface of the projection,
        a clearance hole sized to receive the stem of the valve,
        the sealing surface of the valve bearing against the end surface of the projection to define a closed valve blocking a flow of liquid through the fluid inlet, and
        the sealing surface of the valve being positioned away from the end surface of the projection to define an open valve position permitting the flow of liquid through the fluid inlet.

20. The check valve assembly of claim 19 wherein the first locating element is a locating hole adapted to receive a locating pin in the end surface of the projection for locating the mounting plate with respect to the end surface of the projection.

21. The check valve assembly of claim 19 wherein the mounting plate includes a second clearance hole positioned collinearly with the intersection of the outlet passage in the end surface of the projection.

* * * * *